United States Patent Office 3,308,460
Patented Mar. 7, 1967

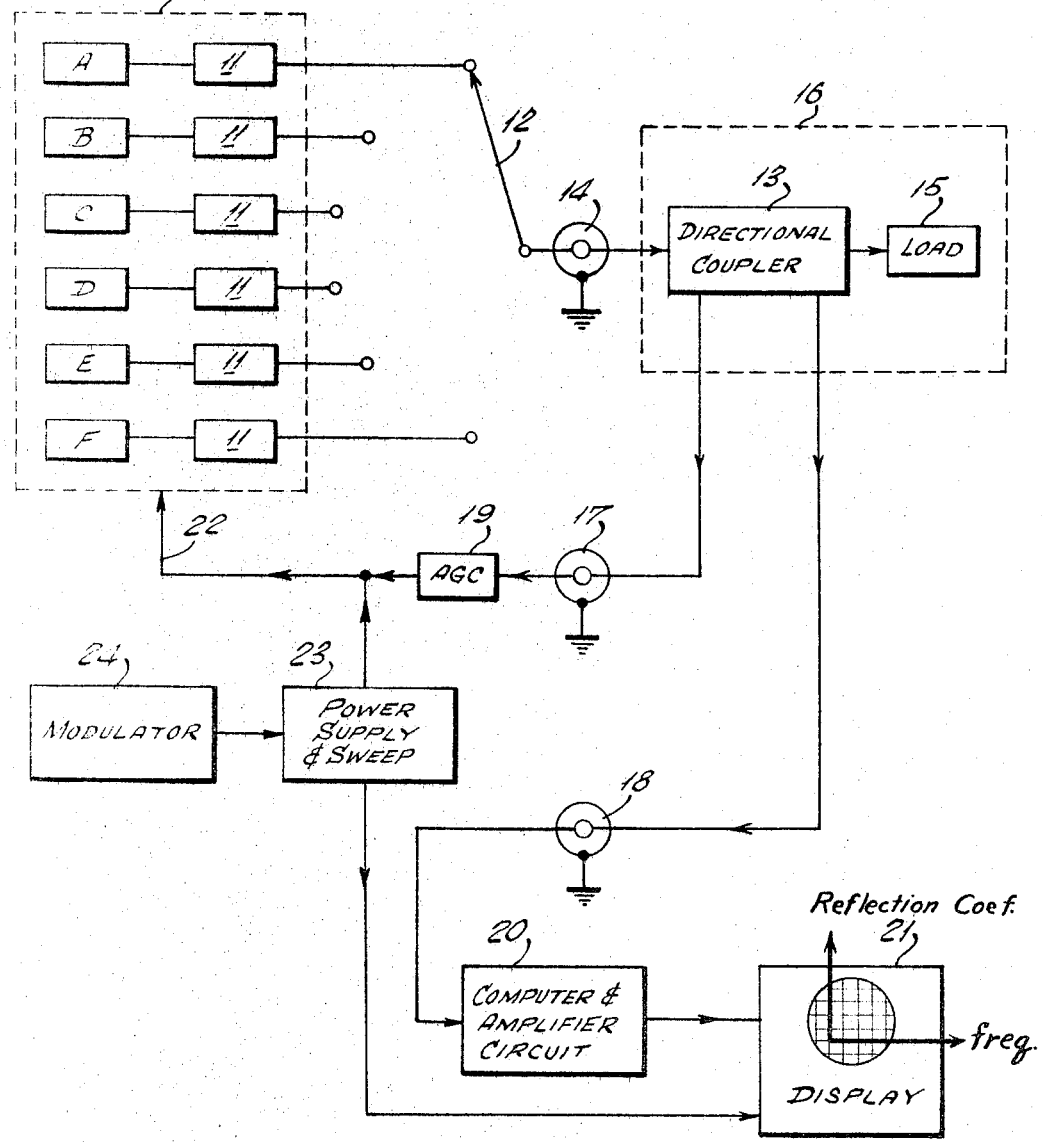

3,308,460
MEASURING REFLECTION CHARACTERISTICS OF R.F. COMPONENTS
Thomas H. O'Brien, Brooklyn, N.Y., assignor to PRD Electronics, Inc., Westbury, N.Y., a corporation of New York
Filed June 27, 1963, Ser. No. 292,198
2 Claims. (Cl. 343—17.7)

This invention relates to means for measuring automatically the Voltage Standard Wave Ratio or the reflection coefficient of radio frequency components over an extremely wide range of radio frequency operation.

It is the principal object of the invention to provide means for accurately measuring the reflection characteristics of a radio frequency component over an extremely wide range of frequencies and, in particular, wherein said means is sufficiently portable to be used in the laboratory or in the field of operation, such as on an airport adjacent an aircraft so that said means may be moved adjacent the aircraft and wherein the item under test is connected to a reflectometer device which may be positioned in the aircraft to minimize disassembly of the aircraft electrical equipment for such test.

It is a further object of the invention to provide means as contemplated herein, wherein the reflection characteristic measurements may be carried out by personnel of minimum technical background and skill.

It is a further object of the invention to provide means as contemplated herein, wherein testing and measurement of the reflection characteristics of the RF component occurs simultaneously with a visual display of same, whereby the RF component can be adjusted or tuned while such corrective adjustment measurements are being displayed.

These objects are carried out herein by a plurality of selectable wide band voltage tunable amplitude controllable oscillators individually switched to feed the radio frequency component under test. A portion of the incident power is fed back through automatic gain control means for the purpose of maintaining the output of the selected oscillator relatively constant with change in its frequency. Additionally, a portion of the reflected power is sampled, amplified and fed to one axis of a display tube. Sawtooth generator means employed to sweep the frequency of the oscillators is coupled to the other axis of the display tube, whereby the display tube depicts reflected power as a function of frequency.

Further objects and advantages will become apparent from the following description of the invention taken in conjunction with the figures, in which:

The figure illustrates in block diagram the system for measuring VSWR or reflection coefficient in accordance with the principles of the invention.

In the figure, reference 10 designates a signal source made up of a plurality of individual backward-wave oscillators or other suitable means such as voltage tuned magnetrons. The six tubes are designated as A, B, C, D, E, F, wherein each tube is equipped to provide a signal over the following operating ranges:

| Tube: | Kmc. |
|---|---|
| A | 8 to 12 |
| B | 4 to 8 |
| C | 2 to 4 |
| D | 1 to 2 |
| E | 0.4 to 1.2 |
| F | .03 to 0.4 |

The outputs of the individual tubes feed into isolation pads 11 or other suitably matched terminations which are essentially uni-directional attenuators presenting a high impedance to a return signal, that is to say, presenting a high attenuation looking into the output of terminations 11 from a selector switch 12. Selection of the individual frequency source A to F is controlled by a coaxial selector switch 12.

The output from source 10 is coupled into the input of a reflectometer high directivity directional coupler 13 by coaxial line 14. The device under test is depicted as load 15. Although all units of the measuring system except for coupler 13 are housed in a console, it will be understood that coupler 13 is transportable into the aircraft for checking the RF antenna or other RF components of its electrical system. Hence, box 16 depicts the items that are within the plane structure, whereas it will be understood that the remainder of the measuring system will be combined in a console, which console may be mounted on a truck. The truck carrying such console may be moved to any convenient position alongside of the aircraft to permit a short connection of coaxial line 14 to connect source 10 to the input of coupler 13.

The design, structure and mode of operation of a reflectometer high directivity coupler as contemplated herein is of the type fully described and claimed in copending applications Serial No. 277,930, filed May 3, 1963, entitled Wide Band Slab Line Coaxial Directional Coupler and in the name of Samuel Hopfer, now U.S. Patent 3,264,582; and Serial No. 280,409, filed May 14, 1963, entitled Means for Supporting the Inner Conductor of a Coaxial Microwave Frequency Device and in the name of Roger E. Doerfler, now U.S. Patent 3,210,698. As set forth in the description of said copending applications, reflectometer 13 is fed by signal source 10 covering a range of frequencies over which load 15 is tested. Directional coupler reflectometer 13 has two outputs. One is an auxiliary incident arm which provides an output signal which is proportional to incident energy fed into directional coupler 13. The other is an auxiliary reflected arm equipped to provide an output signal proportional to the reflected energy, that is to say, energy reflected back into coupler 13 by the item under test. Both auxiliary arms feed into matched detectors, such as crystals, which devices feed their individual signals into respective coax lines 17, 18.

Reference number 17 depicts the incident arm output signal coaxial line for coupling its signal to an automatic gain control network 19. Coaxial line 18 depicts the reflected signal output from reflectometer 13. The reflected signal is fed into the input of a computer and video amplifier circuit 20. The reflected signal is suitably amplified by circuit 20 and then applied to the vertical plates of a calibrated display oscilloscope 21, wherein the reflected signal is displayed over the selected range of frequencies. The output signal proportional to incident power is fed back to the control grid of the selected backward-wave oscillator from the AGC circuit 19 by feed line 22. The AGC circuit 19 maintains the incident signal at a constant level. By such means, it is only necessary that the reflected signal be injected into computing circuit 20 for display on oscilloscope 21, because, by keeping the level of the incident signal fixed, the reflected signal is then compared against a constant. If one employs voltage tunable magnetrons as the individual source tubes A through F, then the feedback signal from line 22 is applied to the injection electrode of the magnetrons to hold the power output of source 10 at a desired constant level across the operating range of frequency of the tubes.

Each of the tubes A through F are designed to supply a slowly swept audio-modulated RF signal via line 14 to coupler 13, wherein the frequency band for test operation encompasses the complete frequency from 30 to 12,000 megacycles as selector switch 12 is moved from one band of operation to the next until the six bands of operation are covered. A saw-tooth voltage from power supply 23 is employed to sweep the individual source tubes A through F through their respective frequency ranges and the saw-tooth voltage is also applied to the horizontal sweep of oscilloscope 21 so as to correlate the reflected signal displayed on the scope with the frequencies over the frequency band of test.

To facilitate signal detection and amplification in the system, the RF signal is modulated by an audio signal applied by modulator 24 to power supply 23 and then to the control grid of the individual BWO tubes or to the injection anode of the magnetrons. The sweep rate and the modulation frequency are suitably chosen so that amplitude variation due to frequency modulation can be easily separated from amplitude modulation by use of a low pass filter in the computing circuit 20. Cathode ray tube 21 may include several interchangeable screens to display the reflection coefficient as a function of frequency by applying the same saw-tooth wave used to sweep the signal source to the horizontal plates of scope 21. Hence, the horizontal axis of scope 21 is made to correspond to frequency, whereas the vertical axis of scope 21 will correspond to the reflection coefficient; it was noted before that the incident power is maintained constant by the feedback by AGC circuit 19.

Inasmuch as six different bands A to F are employed to form the total frequency test spectrum, it will be understood that six corresponding reflectometer directional couplers will be employed for test purposes. Each coupler will be designed to maintain operative frequency characteristics over a band corresponding to a correlated one of said tubes A to F, with the result that each time the selector switch is moved from one tube to the next, a correlated coupler is used for device 13.

The advantages to the system may be readily appreciated by considering a typical test of an antenna incorporated in the instrumentation of an aircraft. This involves basically the following procedures. Select the first coupler 13 corresponding to tube A. Move selector switch 12 to the first junction for feeding signal from tube A into coupler 13. Attach a known standard mismatch load to the output of coupler 13 to display the output characteristic signal of said known mismatch on scope 21. Set the gain of the automatic gain control 19 to indicate a given VSWR or a standard reflection characteristic, whereby if the antenna under test shows a greater mismatch, then it is in excess of required operation and desired standards and thus must be adjusted or replaced. Remove the standard mismatch and replace same by the antenna or other RF component under test and display its reflection characteristic on scope 21. If its reflection characteristic exceeds the reflection characteristic of the standard, then adjustment is required. One will note from the foregoing description that while the antenna or other component under test is being tested, its frequency characteristic is simultaneously being displayed. Since this display is being compared with a display previously established by a standard, the person carrying out the test need not be a skilled technician. This represents a simple "good" and "no good" test operation.

Furthermore, if the technician does see a frequency characteristic response calling for adjustment, he may make the adjustment or let someone else enter into the plane to make the adjustment by tuning the antenna under test until its frequency characteristic or reflection characteristic falls within or better than norm set by the standard mismatch device. Accordingly, it is seen that the second advantage is that the device permits simultaneous testing and indication of response so that one may tune or re-adjust the device under test until it is within the characteristics of desired operation. Testing is carried out for the six bands of operation by adjusting the selector switch to each band.

It is intended that all matter contained in the above description or shown in the accompanying drawings shall be interpreted as illustrative and not in a limiting sense.

What is claimed is:

1. Apparatus for automatically measuring and displaying the reflection characteristics of an RF component under test comprising: a signal source of RF energy having an output, a switch coupled to the output of said signal source for selecting various frequency bands for test measurement of said component, a high directivity reflectometer directional coupler, said reflectometer being portable for positioning same adjacent the RF component under test, coaxial line means coupling the output of the selector switch to the input of the reflectometer, said reflectometer providing two individual output signals, one signal being proportional to incident power fed to said reflectometer from said source and the second signal being proportional to reflected power fed to said reflectometer by said component under test, automatic gain control means for sensing said incident power signal from said reflectometer for regulating said signal source to maintain said signal source at a given power level, means for sensing said reflected power signal from said reflectometer, a calibrated display oscilloscope responsive to said last-mentioned means wherein the output of said last-mentioned means being applied to one pair of plates of said oscilloscope, saw-tooth generating means for sweeping said signal source over the individual frequencies of its operative frequency band, said saw-tooth sweep also being applied to the other pair of plates of said display oscilloscope, wherein the display on said oscilloscope is a synchronized display of the reflection characteristic of the component under test against frequency.

2. Apparatus as defined in claim 1, wherein said display oscilloscope is pre-calibrated by measuring and displaying a known standard or mismatch RF device before connecting the component under test, and said signal source includes a plurality of individual backward-wave oscillators, each providing individual operative frequency bands to define an aggregate operative frequency band for test measurement, said selector switch regulating the selection of the individual frequency band.

References Cited by the Examiner
UNITED STATES PATENTS
3,058,108  12/1962  Turner et al. _____ 343—100

RODNEY D. BENNETT, *Acting Primary Examiner.*
CHESTER L. JUSTUS, *Examiner.*
T. H. TUBBESING, *Assistant Examiner.*